United States Patent
Bernert et al.

(10) Patent No.: US 8,905,276 B2
(45) Date of Patent: Dec. 9, 2014

(54) MOUNTING AND STORAGE SYSTEM AFFIXED TO THE FLOOR OF A VEHICLE TRUNK AND METHOD FOR MOUNTING A DEVICE THEREON

(75) Inventors: Joseph Bernert, Hatboro, PA (US); David Enama, Jamison, PA (US); Mark P. Sundy, Abington, PA (US)

(73) Assignee: Havis, Inc., Warminster, PA (US)

(*) Notice: Subject to any disclaimer, the term of this patent is extended or adjusted under 35 U.S.C. 154(b) by 275 days.

(21) Appl. No.: 13/329,930

(22) Filed: Dec. 19, 2011

(65) Prior Publication Data

US 2013/0153523 A1   Jun. 20, 2013

(51) Int. Cl.
B60R 7/02   (2006.01)

(52) U.S. Cl.
CPC .......................................... *B60R 7/02* (2013.01)
USPC ............ 224/281; 224/282; 224/547; 224/553; 224/554

(58) Field of Classification Search
CPC .............. B60R 5/04; B60R 7/02; B60R 11/06
USPC ......... 224/311, 321, 549, 281, 282, 547, 548, 224/553, 554; 248/320
See application file for complete search history.

(56) References Cited

U.S. PATENT DOCUMENTS

| | | | | |
|---|---|---|---|---|
| 1,243,958 A * | 10/1917 | McFarland | ................. | 296/37.15 |
| 1,398,884 A * | 11/1921 | Aills | ............. | 224/543 |
| 1,571,549 A * | 2/1926 | Kerth | .......................... | 296/26.11 |
| 1,583,623 A * | 5/1926 | Stern | .......................... | 296/26.09 |
| 1,689,417 A * | 10/1928 | Yells | ............................. | 414/534 |
| 2,577,263 A * | 12/1951 | Myers | ........................... | 224/543 |
| 2,953,287 A * | 9/1960 | Werner | ......................... | 224/496 |
| 3,473,680 A * | 10/1969 | Downer | ........................ | 414/462 |
| 4,420,238 A * | 12/1983 | Felix | .............................. | 396/427 |
| 4,573,854 A * | 3/1986 | McFarland | .................... | 414/462 |
| 5,207,470 A * | 5/1993 | Rafi-Zadeh | .................. | 296/37.7 |
| 5,372,289 A * | 12/1994 | Dachicourt | ................... | 224/311 |
| 5,439,152 A * | 8/1995 | Campbell | ..................... | 224/405 |
| 6,308,873 B1 * | 10/2001 | Baldas et al. | ................. | 224/281 |
| 6,502,731 B1 * | 1/2003 | Gehring et al. | ............... | 224/553 |
| 6,572,168 B1 * | 6/2003 | Radstake | ...................... | 312/247 |
| 6,918,734 B2 * | 7/2005 | Nick et al. | ..................... | 414/522 |
| 7,401,716 B2 * | 7/2008 | Svenson et al. | ............ | 224/42.32 |
| 7,621,575 B1 * | 11/2009 | Kellerman | ...................... | 296/16 |
| 7,841,821 B2 * | 11/2010 | Miro et al. | ..................... | 414/462 |
| 8,235,269 B2 * | 8/2012 | Rupar et al. | .................. | 224/539 |
| 2005/0151398 A1 * | 7/2005 | Sitzler et al. | .................. | 296/218 |

FOREIGN PATENT DOCUMENTS

| | | | |
|---|---|---|---|
| CA | 2548067 A1 * | 11/2006 | |
| DE | 102004049224 A1 * | 4/2006 | |
| DE | 102005031072 A1 * | 1/2007 | |
| DE | 102005039810 A1 * | 3/2007 | |

(Continued)

*Primary Examiner* — Michael Safavi
(74) *Attorney, Agent, or Firm* — RatnerPrestia (57) ABSTRACT

Vehicle trunk mounting systems and methods are disclosed. A mounting system comprises a frame adapted to be secured within the trunk and a platform adapted to support a device thereon. The frame comprises a hinge portion and a guide portion. The platform is movably secured within the frame. The frame is rotatable around the hinge portion between a first position in which the platform is substantially horizontal and a second position in which the platform is substantially upright. The platform is slidable within the guide portion when the frame is in the first position. A mounting method comprises mounting the device on the platform, slidably repositioning the platform within the frame, and rotating the frame between the first position and the second position.

22 Claims, 5 Drawing Sheets

(56) References Cited

FOREIGN PATENT DOCUMENTS

| | | | | |
|---|---|---|---|---|
| DE | 102006010377 A1 * | 9/2007 | | |
| DE | 102007006895 A1 * | 8/2008 | | B60R 7/02 |
| DE | 102008027421 A1 * | 1/2009 | | B60R 7/02 |
| DE | 102008029257 * | 12/2009 | | B60J 7/22 |
| DE | 10210884 B4 * | 2/2011 | | |
| DE | 102010063163 A1 * | 6/2012 | | B60R 5/04 |
| DE | 102012203906 A1 * | 9/2013 | | B60R 5/04 |
| DE | 102013002214 A1 * | 3/2014 | | B60R 5/04 |
| EP | 2078636 B1 * | 7/2009 | | B60R 5/04 |
| EP | 2228262 A1 * | 9/2010 | | B60R 5/04 |
| FR | 2009287 A1 * | 1/1970 | | B60R 11/00 |
| FR | 2911552 A1 * | 7/2008 | | B60R 5/04 |
| FR | 2916396 A1 * | 11/2008 | | |
| FR | 2965523 A1 * | 4/2012 | | B60R 5/04 |
| GB | 1446903 A * | 8/1976 | | |

\* cited by examiner

MOUNTING AND STORAGE SYSTEM AFFIXED TO THE FLOOR OF A VEHICLE TRUNK AND METHOD FOR MOUNTING A DEVICE THEREON

FIELD OF THE INVENTION

The present invention relates generally to mounting and storage systems, and more particularly, to systems and methods for mounting devices in the trunk of a vehicle.

BACKGROUND OF THE INVENTION

Specialized vehicles are an essential tool in many different professions. In particular, professions such as law enforcement commonly utilize a number of specialized electronic systems (e.g., computers, radio systems, sirens) that are not found in conventional automobiles. While vehicles may be specially manufactured that include these systems, these systems may also be added to conventional automobiles through after-market installations. However, one problem that arises from such installations is the simple and effective storage of after-market electronic devices in conventional vehicles.

SUMMARY OF THE INVENTION

Aspects of the present invention relate to vehicle trunk mounting systems and methods.

In accordance with one aspect of the present invention, a system for mounting a device in a trunk of a vehicle is disclosed. The system comprises a frame adapted to be secured within the trunk and a platform adapted to support a device thereon. The frame comprises a hinge portion and a guide portion. The platform is movably secured within the frame. The frame is rotatable around the hinge portion between a first position in which the platform is substantially horizontal and a second position in which the platform is substantially upright. The platform is slidable within the guide portion when the frame is in the first position.

In accordance with another aspect of the present invention, a method for mounting a device in a trunk of a vehicle is disclosed. The method comprises mounting the device on a platform, the platform movably secured within a frame, the frame secured within the trunk of the vehicle; slidably repositioning the platform within the frame; and rotating the frame between a first position in which the platform is substantially horizontal and a second position in which the platform is substantially upright.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. According to common practice, the various features of the drawings are not drawn to scale unless otherwise indicated. To the contrary, the dimensions of the various features may be expanded or reduced for clarity. Included in the drawings are the following figures.

DETAILED DESCRIPTION OF THE INVENTION

The systems and methods disclosed herein are usable to provide mounting and storage for devices (e.g., electronic devices) in the trunks of conventional vehicles. The use of the term "trunk" herein is not intended to be limiting. To the contrary, the term "trunk" as used herein is intended to encompass any compartment of a vehicle that is at least partially isolated from a passenger area of the vehicle.

The described embodiments are particularly suitable to provide simple and effective mounting and storage for electronic devices. The disclosed systems and methods are intended to maximize the usable space in the vehicle's trunk, while minimally restricting the user's access to the vehicle's trunk.

The exemplary embodiments disclosed herein are described primarily with respect to conventional vehicles that are modified to include after-market electronic components, e.g., for law enforcement purposes. However, it will be understood by one of ordinary skill in the art that the invention is not so limited. The systems and methods described herein are usable to provide mounting and storage for any suitably sized devices, e.g. non-electronic devices, and are usable in any suitable vehicle.

Figure 1A:
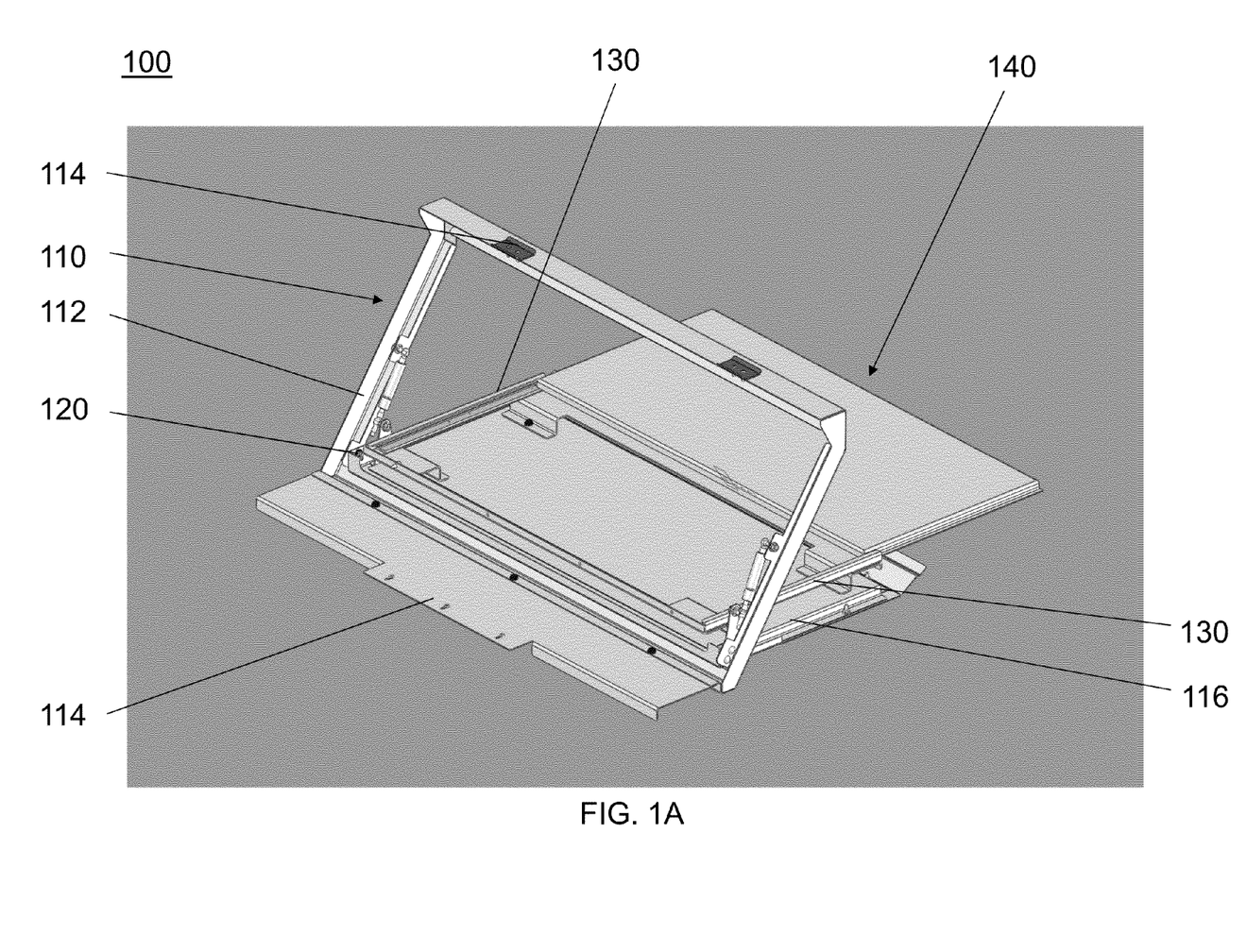
FIGS. 1A and 1B are diagrams illustrating an exemplary mounting system in accordance with the present invention.
Figure 1B:
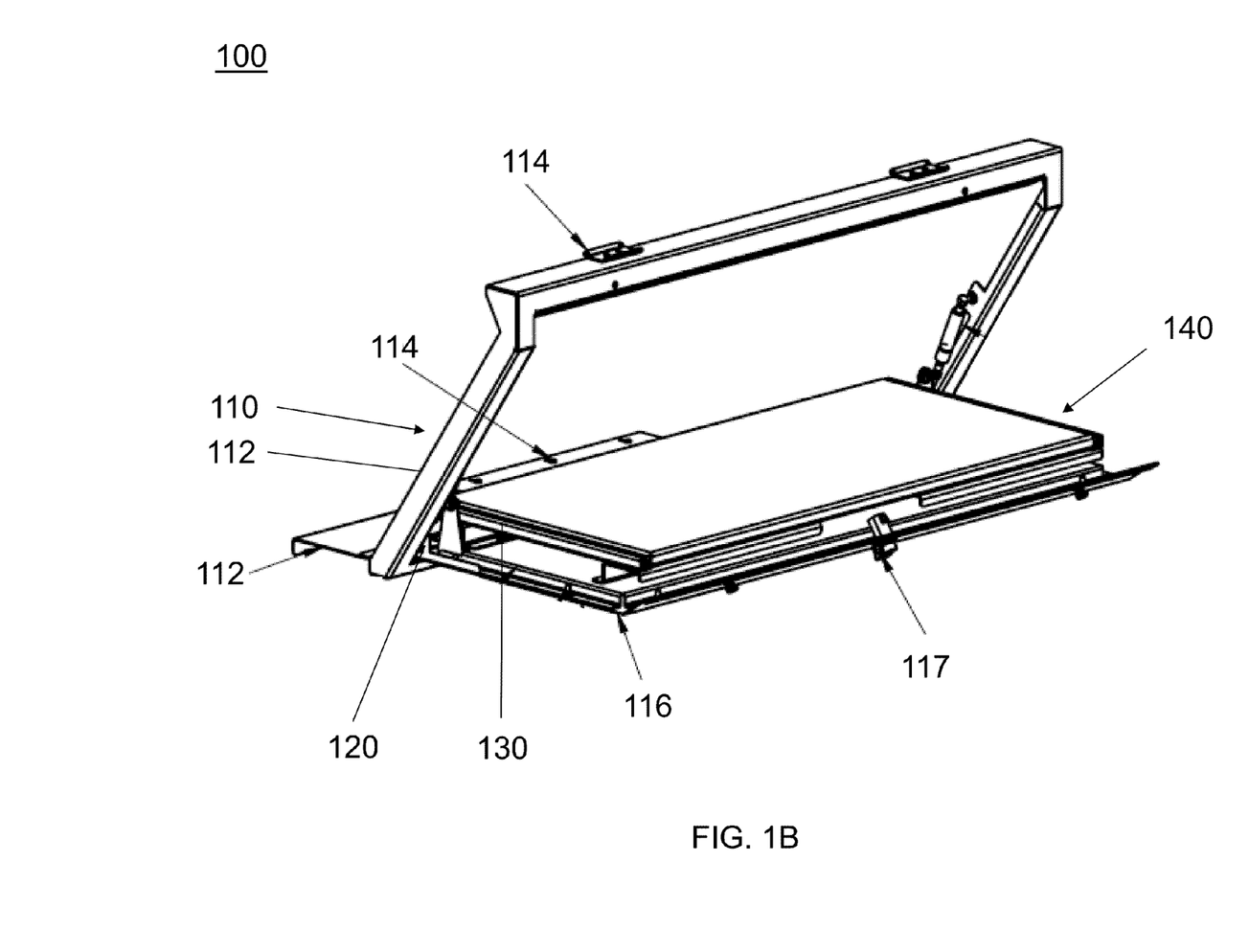

Referring now to the drawings, FIGS. 1A and 1B illustrate a system 100 for mounting a device in a trunk of a vehicle in accordance with aspects of the present invention. Mounting system 100 is usable to mount and store electronic devices within the trunk of a conventional vehicle. As a general overview, mounting system 100 includes a frame 110 and a platform 140. Additional details of mounting system 100 are described herein.

Frame 110 is adapted to be secured within the trunk of a vehicle. Frame 110 may be affixed to the floor of the trunk, the ceiling of the trunk, or both. Portions of frame 110 may desirably be secured directly to the chassis of the vehicle (as opposed to a liner in the vehicle's trunk), in order to better secure frame 110 in place within the vehicle's trunk.

In an exemplary embodiment, frame 110 includes a stationary portion 112 and a movable portion 116, as shown in FIGS. 1A and 1B. Stationary portion 112 includes attachments 114 for affixing frame 110 to both the floor and ceiling of the trunk. Attachments 114 may comprise screws, bolts, or any other suitable mechanical fasteners, as would be understood by one of ordinary skill in the art. Stationary portion 112 is desirably attached toward the rear of the trunk (e.g. toward the front of the vehicle). Movable portion 116 is coupled to stationary portion 112. Movable portion 116 is sized to house and/or cover platform 140. As will be described herein, movable portion 116 is configured to rotate relative to stationary portion 112. Movable portion 116 may further include a handle mounted thereon to assist a user in rotating movable portion 116 relative to stationary portion 112.

Frame 110 comprises a hinge portion 120. Frame 110 is rotatable around hinge portion 120. Frame 110 is desirably rotatable between two different positions. In a first position, frame 110 is rotated around hinge portion 120 such that platform 140 is substantially horizontal (i.e. parallel to the floor of the trunk), as shown in FIGS. 1A and 1B. In a second position, frame 110 is rotated around hinge portion 120 such that platform 140 is substantially upright (i.e. at an angle with respect to the floor of the trunk).

Frame 110 may desirably include one or more structures 117 to secure the frame in the second, upright position, as shown in FIG. 1B, and prevent frame 110 from rotating unexpectedly. Suitable structures 117 include mechanical catches, latches, fasteners and other similar devices, and will be known to one of ordinary skill in the art from the description herein. Structures 117 may further include a locking portion, to prevent unauthorized users from rotating frame 110 from the second position to the first position. Such a locking portion on structures 117 may be desirable to prevent unauthorized use or removal of the devices stored on platform 140.

In an exemplary embodiment, hinge portion 120 couples stationary portion 112 to movable portion 116, and enables rotation of movable portion 116 relative to stationary portion 112. Thus, in this embodiment it is movable portion 116 rotates between the two positions of frame 110 outlined above. Stationary portion 112 may include one or more structures to secure movable portion 116 in place when it is rotated to be in the second, upright position. Hinge portion 120 forms part of stationary portion 112, and is desirably mounted to (and position directly adjacent) the floor of the trunk, as shown in FIGS. 1A and 1B, such that movable portion 116 rotates upward toward the ceiling of the trunk when transitioning between the first position and the second position. Suitable structures for use as hinge portion 120 will be known to one of ordinary skill in the art from the description herein.

Frame 110 comprises a guide portion 130. Guide portion 130 enables movement of platform 140 relative to frame 110. Guide portion 130 may desirably restrict platform 140 to slidable movement relative to frame 110. In an exemplary embodiment, guide portion 130 forms part of movable portion 116 of frame 110. Guide portion 130 may comprise one or more grooves or rails adapted to receive a corresponding projection on platform 140 (or vice versa). Guide portion 130 may further comprise conventional drawer slides. Other suitable structures for guide portion 130 will be known to one of ordinary skill in the art from the description herein.

Platform 140 is adapted to support devices thereon. Platform 140 may be usable to support a plurality of electronic devices including, for example, light and/or siren controllers, radio controllers, computer processors, amplifiers, wireless and/or GPS transceivers, or other suitable electronic devices. The electronic devices mounted on platform 140 may be operable to communicate components mounted elsewhere in the vehicle. Platform 140 may include through-holes, rails, posts, brackets, or any other structures to promote the mounting of electronic devices thereon.

Platform 140 is movably secured within frame 110. In particular, platform 140 is slidably positioned within guide portion 130 of frame 110. Platform 140 may desirably be slidable between two different positions. In a first position, platform 140 is slid to be positioned near a front of the trunk (e.g. toward the rear of a conventional vehicle), as shown in FIG. 1A. In a second position, platform 140 is slid to be positioned near a rear of the trunk (e.g. toward the front of a conventional vehicle), as shown in FIG. 1B. Frame 110 may desirably include one or more structures 117 to secure platform 140 in the second, upright position, as shown in FIG. 1B.

Platform 140 may be configured such that it is slidable within guide portion 130 only when frame 110 is rotated to be in the first position (i.e., the position in which platform 140 is substantially horizontal). Conversely, frame 110 may be configured such that it is only rotatable around hinge portion 120 when platform 140 is slid to be in the second position (i.e., the position in which platform 140 is fully withdrawn toward the rear of the trunk).

As set forth above, when frame 110 is rotated to be in the second position, platform 140 is in a substantially upright position. As used herein, the term "substantially upright" does not require that platform 140 be positioned at a 90° angle when in the second position. To the contrary, in the substantially upright second position, platform 140 may be positioned at an angle less than or equal to 90°, for example, at an angle parallel to a rear wall of the trunk of the vehicle.

When frame 110 is rotated to be in the second position, it may be desirable that platform 140 be positioned directly adjacent the rear wall of the trunk, i.e., positioned with little or no air gap between the electronic devices mounted on platform 140 and the rear wall of the trunk (e.g., only enough space for air circulation around the electronic devices and/or for wire harnesses associated with the electronic devices). This position is desirable in order to maximize the use of the trunk space. In an exemplary embodiment, when platform 140 is in the upright position, movable portion 116 covers platform 140 (i.e. forms a barrier between platform 140 and the rest of the trunk), and substantially all of the floor of the trunk is exposed to the user.

Platform 140 may or may not be removable from frame 110 without disassembly of frame 110. In an exemplary embodiment, when platform 140 is in the first position (i.e. slidably positioned toward the front of the trunk), platform 140 may be detachable from guide portion 130 in order to remove platform 140 from the trunk entirely. This may be desirable in order to enable easier attachment of electronic devices to platform 140, and to enable use of the trunk without obstruction by platform 140, if necessary. Suitable structures for enabling release of platform 140 from sliding engagement with guide portion 130 will be known to one of ordinary skill in the art from the description herein.

Mounting system 100 is not limited to the above components, but may include alternative components and/or additional components, as would be understood by one of ordinary skill in the art from the description herein.

For example, mounting system 100 may include a spring component coupled to frame 110. The spring component may operate to assist a user in rotating frame 110 around hinge portion 120. For example, when components are mounted to platform 140, it may be desirable to include a spring component configured to bias platform 140 upward, and thereby assist the user in rotating platform 140 from the first, horizontal position to the second, upright position. The spring component may further assist mechanical structures 117 in maintaining frame 110 and platform 140 in the second position. In an exemplary embodiment, the spring component is a gas shock absorber. Suitable structures for use as the spring component will be known to one of ordinary skill in the art from the description herein.

For another example, mounting system 100 may be desirably used to store devices that are too tall to fit on platform 140 when platform 140 is in the upright position. Accordingly, platform 140 may be removable from guide portion 130 (as described above), and the devices may be mounted directly on movable portion 116 of frame 110. This modification allows for storage of taller devices.

For yet another example, frame 110 and guide portion 130 may include cushioning elements to prevent the components of mounting system 100 from rattling during operation of the associated automobile. In an exemplary embodiment, mounting system 100 may include rubber bumpers on guide portion 130 or platform 140 positioned in the locations where platform 140 contacts guide portion 130 at the end of its sliding movement. In another embodiment, stationary portion 112 and movable portion 116 may include rubber bumpers positioned in the locations where they contact each at the end of the rotational movement of movable portion 116.

FIGS. 2A-2D illustrate an exemplary mounting system 200 secured within a trunk 250 of a vehicle in accordance with aspects of the present invention. Mounting system 200 includes the same components described above with respect to mounting system 100, unless otherwise indicated. The operation of mounting system 200 will now be described with reference to FIGS. 2A-2D.

Figure 2A:
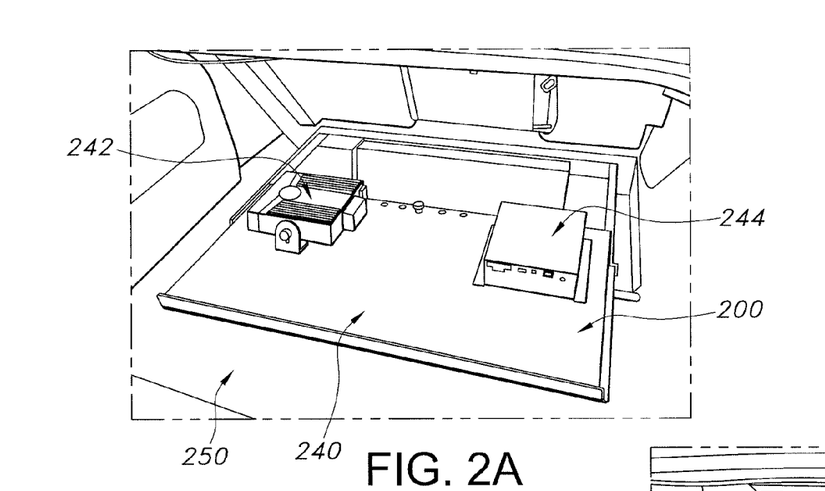
FIGS. 2A-2D are images illustrating an exemplary mounting system secured within the trunk of a vehicle in accordance with aspects of the present invention.
Figure 2B:
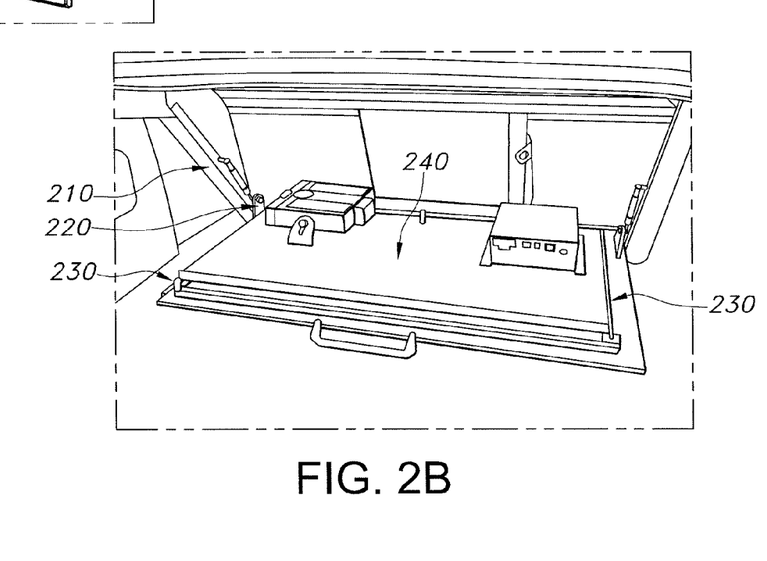

As shown in FIGS. 2A and 2B, mounting system 200 includes a frame 210 and a platform 240. Platform is adapted to support electronic devices 242 and 244, which are mounted thereon. Frame 210 includes a stationary portion and a movable portion. Frame 210 comprises a hinge portion 220 that rotatably couples the stationary portion to the movable portion. Frame 210 also comprises a guide portion 230. Platform 240 is slidably positioned in guide portion 230 of frame 210.

As shown by comparison in FIGS. 2A and 2B, platform 240 is slidable between two different positions. In the first position, platform 240 is slid to be positioned near a front of trunk 250, as shown in FIG. 2A. This position enables easier access to electronic devices 242 and 244, e.g., for removal, installation, or modification. In the second position, platform 240 is slid to be positioned near a rear of the trunk, as shown in FIG. 2B. Platform 240 is slidable within guide portion 230 only when frame 210 is rotated to be in the first position (i.e., the position in which platform 240 is substantially horizontal).

Figure 2C:
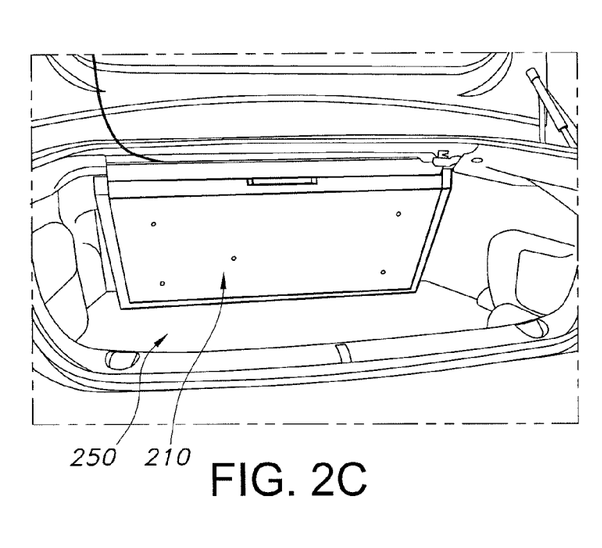
Figure 2D:
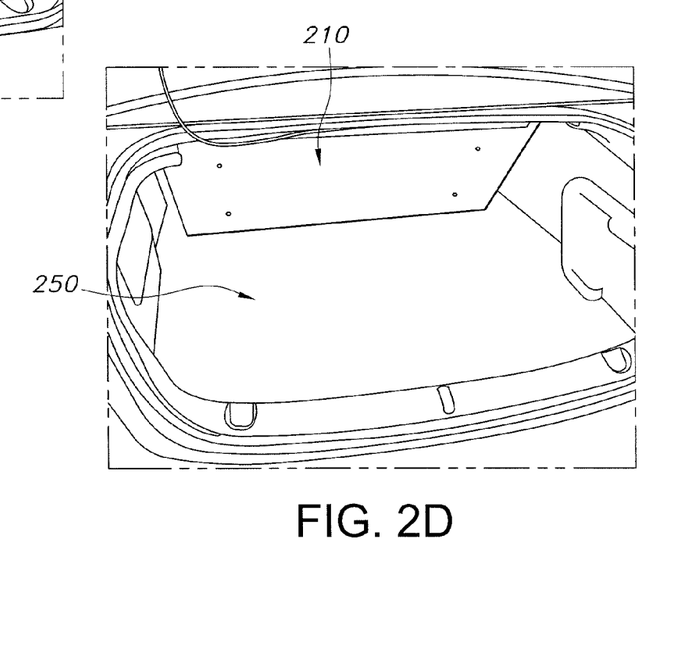

As shown by comparison in FIGS. 2B and 2C, frame 210 is rotatable between two different positions. In the first position, frame 210 is rotated to a position in which platform 240 is substantially horizontal, as shown in FIG. 2B. It is in this position of frame 210 that platform 240 can be slidably repositioned. In a second position, frame 210 is rotated upward (i.e. with the front portion of platform 240 rotating toward the ceiling) to a position in which platform 240 is substantially upright, as shown in FIG. 2C. In this position, platform 240 is positioned directly adjacent the rear wall of trunk 250, i.e., positioned with little or no air gap between electronic devices 242 and 244 and the rear wall of the trunk 250. As shown in FIG. 2D, when platform 240 is in the upright position, the movable portion of frame 210 covers platform 240, and substantially all of the floor of trunk 250 is exposed to the user. This may be desirable in order to enable the user to store other larger objects within trunk 250, or to enable the user to access objects stored below the floor of trunk 250 (e.g., a spare tire).

Figure 3:
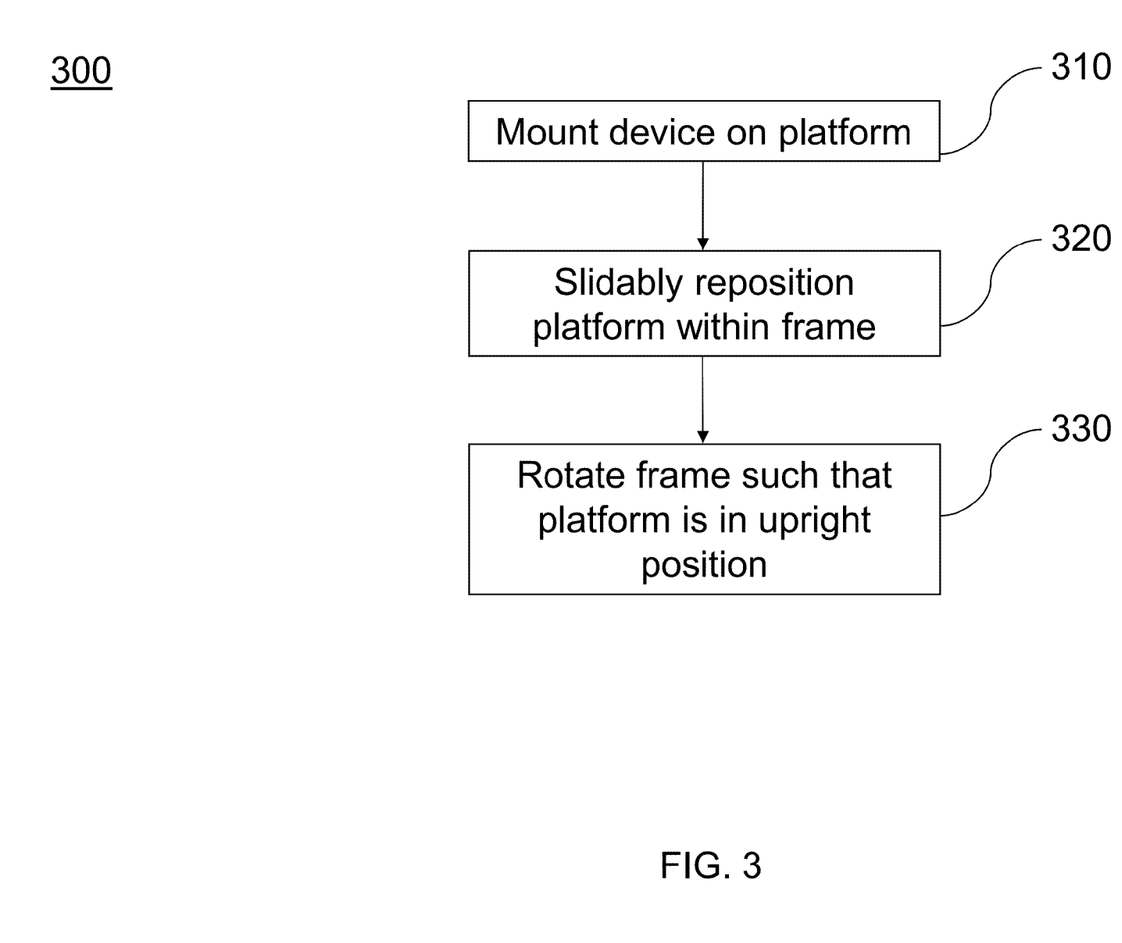
FIG. 3 is a flowchart illustrating an exemplary mounting method in accordance with aspects of the present invention.

FIG. 3 shows an exemplary method 300 for mounting a device in a trunk of a vehicle in accordance with aspects of the present invention. Method 300 is usable to mount and store electronic devices within the trunk of a conventional vehicle. As a general overview, method 300 includes mounting a device on a platform, sliding the platform within a frame, and rotating the frame. Additional details of method 300 are described herein with respect to the components of mounting system 100.

In step 310, a device is mounted on a platform. In an exemplary embodiment, one or more electronic devices are mounted on platform 140. As described above, platform 140 is movably secured within frame 110 within the trunk of a vehicle. Platform 140 may include through-holes, rails, posts, brackets, or any other structures to promote the mounting of electronic devices thereon.

In step 320, the platform is slidably repositioned with the frame. In an exemplary embodiment, platform 140 is slidably repositioned within frame 110. Frame 110 includes guide portion 130, and platform 140 is slidably positioned within guide portion 130 of frame 110. Platform 140 may desirably be slidable between two different positions, as described above.

In step 330, the frame is rotated. In an exemplary embodiment, frame 110 is rotated around hinge portion 120. Hinge portion 120 may be mounted to the floor of the trunk, as discussed above, such that the front portion of platform 140 is rotated upward toward the ceiling of the trunk. Frame 110 is desirably rotatable between two different positions, as described above. When frame 110 is rotated to be in the second position, platform 140 may be positioned directly adjacent the rear wall of the trunk, i.e., positioned with little or no air gap between the electronic devices mounted on platform 140 and the rear wall of the trunk. Accordingly, when platform 140 is in the upright position, movable portion 116 covers platform 140, and substantially all of the floor of the trunk is exposed to the user.

It will be understood that method 300 is not limited to the above steps, but may include alternative steps and additional steps, as would be understood by one of ordinary skill in the art from the description herein.

For one example, it may be desirable to remove platform 140 from the trunk, e.g., in order to enable easier attachment of electronic devices to platform 140, and to enable use of the trunk without obstruction by platform 140, if necessary. Accordingly, method 300 may include the step of removing the platform from the frame without disassembly of the frame.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for mounting a device in a trunk of a vehicle comprising:
   the trunk of the vehicle;
   a frame adapted to be secured within the trunk, the frame comprising a hinge portion and a guide portion, the hinge portion of the frame being mounted to a floor of the trunk; and
   a platform adapted to support the device thereon, the platform movably secured within the frame,
   wherein the frame is rotatable around the hinge portion between a first position in which the platform is substantially parallel with the floor of the trunk and a second position in which the platform is substantially upright, and
   the platform is slidable within the guide portion when the frame is in the first position.

2. The system of claim 1, wherein
   the platform is slidable between a first position in which the platform is positioned near a front of the trunk and a second position in which the platform is positioned near a rear of the trunk.

3. The system of claim 2, wherein
   the frame is rotatable only when the platform is slidably positioned in the second position.

4. The system of claim 1, wherein the platform is positioned adjacent a rear wall of the trunk when the frame is in the second position.

5. The system of claim 4, wherein substantially all of the floor of the trunk is exposed to a user when the frame is in the second position.

6. The system of claim 1, wherein the platform is removable from the frame without disassembly of the frame.

7. The system of claim 1, wherein the frame comprises a latch portion, the latch operable to release the frame from the trunk of the vehicle when the frame is secured within the trunk.

8. The system of claim 1, wherein the frame comprises a mechanical catch adapted to secure the frame in place when the frame is in the second position.

9. A method for mounting a device in a trunk of a vehicle comprising:
- mounting the device on a platform, the platform movably secured within a frame, the frame secured within the trunk of the vehicle;
- slidably repositioning the platform within the frame; and
- rotating the frame around a hinge portion mounted to a floor of the trunk between a first position in which the platform is substantially parallel with the floor of the trunk and a second position in which the platform is substantially upright.

10. The method of claim 9, wherein the repositioning step comprises:
- slidably repositioning the platform between a first position in which the platform is positioned near a front of the trunk and a second position in which the platform is positioned near a rear of the trunk.

11. The method of claim 9, wherein the rotating step comprises:
- rotating the frame such that in the second position, the platform is positioned adjacent a rear wall of the trunk.

12. The method of claim 11, wherein the rotating step comprises:
- rotating the frame such that in the second position, substantially all of the floor of the trunk is exposed to a user.

13. The method of claim 9, further comprising the step of:
- removing the platform from the frame without disassembly of the frame.

14. The method of claim 9, further comprising the step of:
- releasing the frame from the trunk of the vehicle by operating a latch portion on the frame.

15. The method of claim 14, further comprising the step of:
- securing the frame in the second position with a mechanical catch provided on the frame.

16. A system for mounting a device in a trunk of a vehicle comprising:
- the trunk of the vehicle;
- a frame adapted to be secured within the trunk, the frame comprising a hinge portion mounted to a floor of the trunk; and
- a platform adapted to support the device thereon, the platform movably secured within the frame such that the platform is removable from the frame without disassembly of the frame,
- wherein the frame is rotatable around the hinge portion between a first position in which the platform is substantially parallel with the floor of the trunk and a second position in which the platform is substantially upright.

17. The system of claim 16, wherein the platform is positioned adjacent a rear wall of the trunk when the frame is in the second position.

18. The system of claim 17, wherein substantially all of the floor of the trunk is exposed to a user when the frame is in the second position.

19. The system of claim 16, wherein the frame comprises a mechanical catch adapted to secure the frame in place when the frame is in the second position.

20. The system of claim 16, wherein when the frame is in the second position, the platform blocks access between an opening of the trunk and the device supported on the platform.

21. A system for mounting a device in a trunk of a vehicle comprising:
- the trunk of the vehicle;
- a frame adapted to be secured within the trunk, the frame comprising a hinge portion mounted to a floor of the trunk; and
- a platform adapted to support the device thereon, the platform movably secured within the frame,
- wherein the frame is rotatable around the hinge portion between a first position in which the platform is substantially parallel with the floor of the trunk and a second position in which the platform is substantially upright, and
- wherein the frame comprises a latch portion, the latch operable to release the frame from the trunk of the vehicle when the frame is secured within the trunk.

22. A system for mounting a device in a trunk of a vehicle comprising:
- the trunk of the vehicle;
- a frame adapted to be secured within the trunk, the frame comprising a hinge portion mounted to a floor of the trunk; and
- a platform adapted to support the device thereon, the platform movably secured within the frame,
- wherein the frame is rotatable around the hinge portion between a first position in which the platform is substantially parallel with the floor of the trunk and a second position in which the platform is substantially upright, and
- wherein the frame comprises a locking portion configured to prevent an unauthorized user from rotating the frame from the second position to the first position.

* * * * *